United States Patent [19]

Robbins

[11] 4,300,043
[45] Nov. 10, 1981

[54] STABILIZED RADIOACTIVE LOGGING METHOD AND APPARATUS

[75] Inventor: Carl A. Robbins, Houston, Tex.

[73] Assignee: Halliburton Company, Duncan, Okla.

[21] Appl. No.: 43,598

[22] Filed: May 29, 1979

[51] Int. Cl.³ .......................... G01V 5/00; G01T 1/20
[52] U.S. Cl. ................................ 250/262; 250/363 R
[58] Field of Search ............ 250/252, 261, 262, 363 R

[56] References Cited

U.S. PATENT DOCUMENTS

| | | | |
|---|---|---|---|
| 3,270,205 | 8/1966 | Ladd et al. | 250/362 |
| 3,767,921 | 10/1973 | Jones | 250/261 |
| 3,772,513 | 11/1973 | Hall, Jr. et al. | 250/262 |
| 3,829,686 | 8/1974 | Schultz et al. | 250/261 |
| 3,916,685 | 11/1975 | Paap et al. | 73/152 |
| 3,939,343 | 2/1976 | Schultz et al. | 250/262 |
| 4,002,903 | 1/1977 | Pitts, Jr. et al. | 250/267 |
| 4,053,767 | 10/1977 | Kampfer et al. | 250/252 |

Primary Examiner—Alfred E. Smith
Assistant Examiner—Janice A. Howell

Attorney, Agent, or Firm—John H. Tregoning; William J. Beard

[57] ABSTRACT

An oil well logging apparatus is disclosed for detecting radiation emanating or returning from an oil well formation. The apparatus has a scintillation crystal adjacent a photomultiplier tube for detecting light flashes generated in the crystal by radiation. A low energy gamma source is included in the crystal for generating a known peak of pulse counts in the energy spectrum. A cadmium shield is placed over the crystal to block low energy radiation which would tend to mask the peak of gamma source pulses. This known peak is divided electrically downhole by window discriminators such that the peak is equally divided into two windows at a standard condition. If the frequency of pulses in one window varies from the frequency of pulses in the second window, a correction factor is generated downhole for varying the pulse height of the entire spectrum until the frequency of pulses in each window is again equal. Salinity compensation is also accomplished by samarium sleeves in the logging sonde.

15 Claims, 4 Drawing Figures

STABILIZED RADIOACTIVE LOGGING METHOD AND APPARATUS

BACKGROUND AND SUMMARY OF THE INVENTION

This invention relates to radioactive well logging methods and apparatus for investigating subsurface earth formations traversed by a borehole. The invention more particularly relates to compensation of drift in a scintillation type gamma ray detector and compensation for salinity effects in the borehole.

It is well known that in oil and gas wells physical characteristics of the formation surrounding the well and the chemical content of the formations and fluids in the formations can be determined from radiation emanating from the formation. The radiation detected may be either radiation naturally originating in the formation or may be induced radiation caused by irradiating the formation during the well logging operation.

Scintillation detectors have long been used for analyzing the energy content characteristics of the radiation from the formation to enable the determination of a spectrum of pulse heights being emitted by a formation.

Various ways of compensating the response of a scintillation detector have been tried including providing the downhole detector with an oscillator for generating standard pulse heights, a light emitting diode for producing standard light flashes to be detected by the photomultiplier tube, a standard radioactive source and crystal to generate a known peak of pulses, or picking out a naturally existing peak of pulses to be used as the standard to correct any drift which may occur in the detector.

In U.S. Pat. No. 4,053,767 assigned to the assignee of the present invention a small crystal with a radioactive source is embedded into the main crystal and is placed adjacent to a photomulitplier tube such that the photomultiplier tube views the light pulses generated by the radioactive source. These standard light pulses are transmitted to the surface along with the data pulses sensed by the main crystal for analysis at the surface.

Samarium sleeves have also been used around the outside of the logging sonde to compensate for salinity effects.

In the present invention a radioactive source is placed in the end of the main crystal removed from the photomultiplier tube and is arranged such that the main crystal itself generates responsive to the reference source. Thus the reference pulses may monitor any changes in the response of the scintillating crystal as well as those changes in the photomultiplier tubes or the electronics of the detector. The reference pulses are divided by two window discriminators which are located downhole. The limits of the window discriminators are set such that the pulses in the first window are equal to the pulses in the second window at standard conditions. The frequency of pulses in each window are compared one with another and are integrated such that if the reference peak shifts, the integrator will produce a correction factor which may be used to shift the entire spectrum being sensed until the frequency of pulses in each window are again equal. All of the stabilization circuits are contained downhole such that only corrected pulses are transmitted to the surface.

The reference pulses are in that portion of the spectrum removed from the information bearing data. This arrangement provides that not later correction is necessary to remove the reference pulses from the spectrum being logged. The reference pulses are in the lower end of the energy spectrum. A cadmium shield is placed around the scintillation crystal to block low energy radiation from entering the crystal and masking the reference pulses.

The present invention also contains salinity compensation comprising samarium sleeves located on the inside of the logging sonde and spectrum discriminators whose limits are set such that compensation is made for the effects of salt in the borehole or formation fluids.

DESCRIPTION OF THE PREFERRED EMBODIMENT

Figure 1:
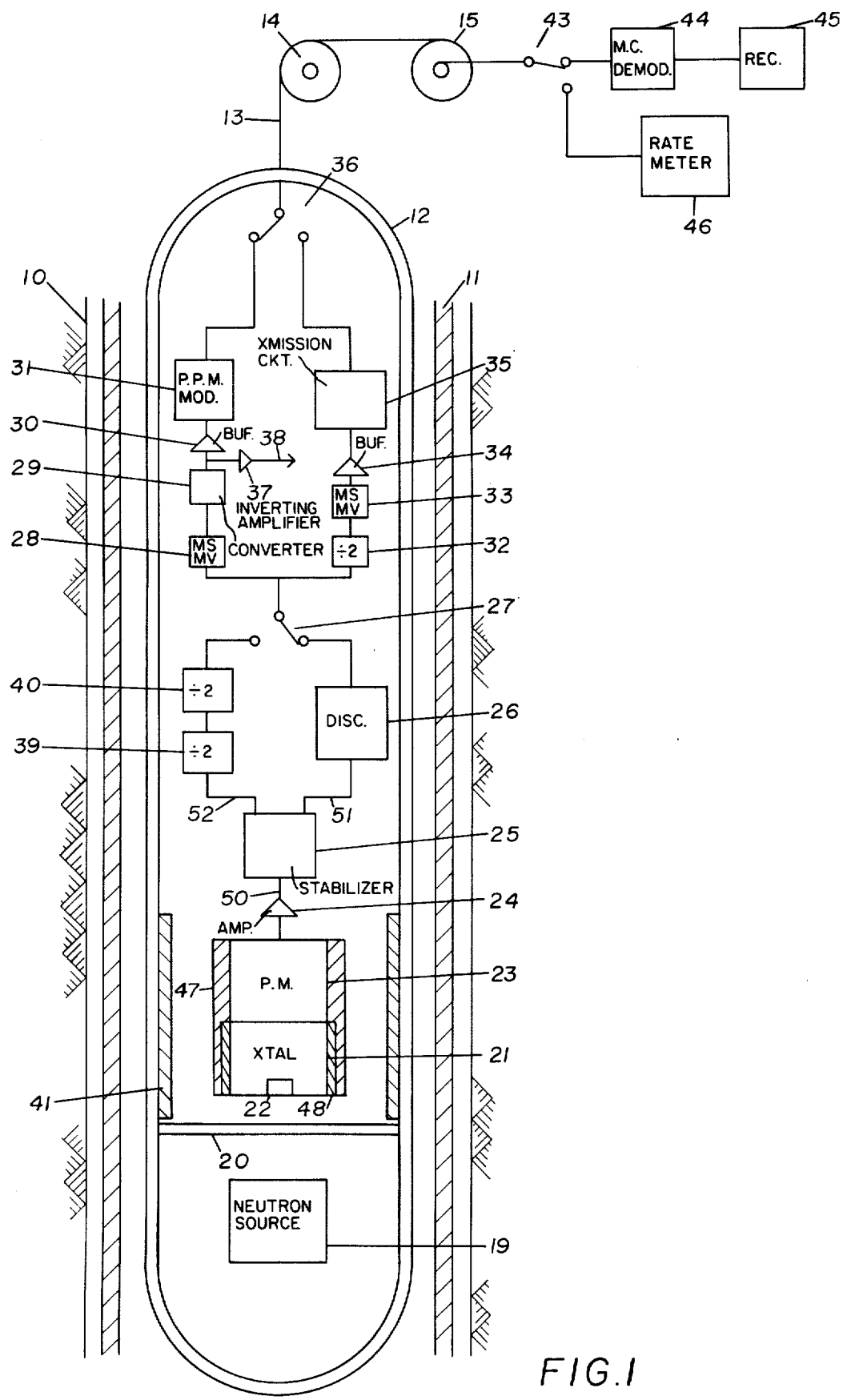
FIG. 1 is a cross-sectinal view of the logging apparatus in place in the borehole and includes a block diagram of the scintillation detector, stabilizing circuitry, and transmission circuitry.

The environment with the apparatus of the invention in use is illustrated in FIG. 1 which shows a borehole 10 cased by a well casing 11. A logging sonde 12 of the invention is passed through the borehole by a cable 13 which is connected to the sonde 12 and passes over a sheave 14 at the surface to a take-up reel 15. Thus it will be understood by those skilled in the art that the logging sonde 12 is lowered into and withdrawn from the borehole 10 by the action of the take-up reel 15.

Within the logging sonde 12 is located a neutron source 19 such as a 5 curie americium beryllium 241 source. As will be understood by those skilled in the art, the formation is bombarded by neutrons from source 19 and returning radiation is sensed and analyzed to determine characteristics of the bombarded formation.

The neutron source 19 is shielded from the rest of the sonde by shield 20 such that the radiation emitted by source 19 irradiates the formation before its effect is detected by the detector apparatus of the invention. The detector apparatus includes a scintilation crystal 21 such as a thallium activated sodium iodide crystal. The scintillation crystal 21 includes a radiation source 22 such as americium 241, and preferably emits monoenergetic gamma particles having a 60 Kev peak. As is known, the returning radiation from the formation and the gamma radiation from source 22 cause scintillations or light flashes in the crystal 21 which are in turn detected by a photomulitplier tube 23. The electric signals from the photomultiplier tube 23 are amplified by preamp 24 and fed into a spectrum stabilizer circuit 25 via input lead 50.

It will be noted that the gamma particle source 22 is located at the bottom or remote end of the crystal 21. Thus the light flashes produced by the crystal 21 in response to the gamma particles emitted by source 22 will traverse the crystal 21 before being sensed by the photomultiplier tube 23. This results in a stabilizing system which includes any changes which may occur in the sensing crystal 21 as well as the photomultiplier tube 23 and later electronics.

A shield 48 of an element having a high atomic number, but which does not produce secondary radiation having the energy of source 22, is provided around the crystal 21. Thus the energy pulses produced by source 22 are sensed by tube 23 without being masked by radiation of the same energy level coming from the borehole being logged. The shield 48 passes higher level energy pulses of the energy being logged. The preferred shield 48 is cadmium having about a 20 mil. thickness.

A first output 51 of spectrum stabilizer circuit 25 leads to a window discriminator circuit 26. The window discriminator 26 passes a band of pulses above a first height but below a second height. In the present invention, the window discriminator passes pulses above the 500 Kev level but below the 2.5 Mev level.

A switch means 27 is provided to pass either pulses from the window discriminator 26 or pulses from the calibration circuit, which circuit will be explained later. The pulses from the switch means 27 are then processed for transmission over the cable 13 by pulse position modulation or by actual data pulses. The mode of transmission of the data is determined, as may be desired, by the setting of switch means 36.

The pulse position modulation circuit includes a one shot circuit 28, frequency-to-voltage converter 29, a buffer circuit 30, and a pulse position modulation multichannel circuit 31. The multichannel circuit 31 may be one of several known by those skilled in the art, and may incorporate the signal from the present invention with signals from other downhole logging tools for transmission of the data to the surface over a conductor in cable 13.

Connected to the output of the frequency-to-voltage converter 29 is an inverting amplifier 37 having a negative DC output lead 38 for use by other tools connected to the logging sonde 12 as may be desired.

The pulse transmission system includes a divide by 2 scaler 32, a one shot circuit 33, a buffer circuit 34, and a transmission circuit 35 for transmitting the pulses from buffer circuit 34 of one polarity. The transmission circuit 35 may be used with a natural gamma ray detector and may transmit pulses from the natural gamma ray detector of an opposite polarity from the pulses of buffer 34. Such a scheme is known in the art and would permit the transmission of both natural gamma ray pulses and neutron-gamma ray pulses to the surface.

Another form of the apparatus of the invention would be to supply either the multichannel circuit 31 of the transmission circuit 35 with appropriate surface equipment for the transmission scheme desired rather than including both circuits 31 and 35 with switch 36 as shown.

Provided is a calibrate circuit, including a calibration output 52 from spectrum stabilizing circuit 25 and a pair of divide by 2 scalers 39 and 40. The scalers 39 and 40 divide the pulses from output 52 to a more usable rate. When the switch 27 is in the calibrate position, the pulses from the calibration circuit are provided to the pulse position modulation circuit and the pulse circuit as set out above.

Samarium oxide sleeves 41 and 47 are provided inside the housing of sonde 12 and are positioned to surround the neutron source 19, the scintillation crystal 21 and photomultiplier tube 23 to reduce the salinity effects of the detecting apparatus.

For a given neutron source strength, there is only a finite number of neutrons available for capture by elements in the borehole and formation. Both samarium and chlorine have relatively large thermoneutron capture cross-sections. When chlorine is present in the formation and/or the borehole, there are fewer neutrons available for capture by other elements, including the samarium in the sleeve 41, and hydrogen in the formation fluid. Conversely, if no chlorine is present, there is a correspondingly larger fraction of neutron flux available for capture by hydrocarbon and samarium.

Thermoneutron capture in both samarium and chlorine produce complex gamma ray spectra over a wide energy range. The energy characteristics are, however, quite different. The chlorine capture spectrum exhibits several relatively intense peaks from 4 Mev to 7 Mev and additional radiation at lower energies. Samarium exhibits a predominance of gamma radiation below approximately 2 Mev. Hydrogen, upon capture of thermoneutrons, emits monoenergetic gamma radiaton at 2.22 Mev.

By adjusting the energy bias of the detector, controlling the concentration of samarium contained in the samarium sleeves 41 and 47, and optimizing the source-detector spacing, the sonde 12 can be designed such that the count rate from thermoneutron capture in chlorine is an inverse function of the count rate from capture in hydrogen and the samarium sleeve 41. The result is logging sonde 12 whose response is independent of the salinity of the borehole and formation fluid. It has been determined that a detector energy bias of 500 Kev to 2.50 Mev produces the desired salinity compensation.

The high end of 2.5 Mev provides for chlorine effect reduction while the low end of 500 Kev reduces the effect of natural gamma radiation. This range includes the energy peak exhibited by hydrogen making the log valuable for porosity measurements.

In the past it has been the practice to place the samarium oxide sleeve outside the housing of the sonde in order that all thermoneutrons may reach the samarium sleeve without being captured by the steel of the sonde housing. It has been found that the log results are not materially affected by placing the sleeve 41 inside the sonde housing; and that by placing the sleeve 41 on the inside, it is not damaged or eroded by movement of the sonde 12 through the borehole.

A switch 43 is provided at the surface and is set to correspond with the setting of switch 36 to select either the pulse position modulation scheme of transmission or the pulse scheme of transmission for display. A multichannel panel 44 to demodulate the pulse position modualted signal over cable 13 is connected to one side of the switch 43 and is in turn connected to a recorder 45 for recording the pulses demodulated by the panel 44. A rate meter 46 is connected to the other side of switch 43 for displaying the pulse counts transmitted over cable 13 by the pulse transmission circuit 35.

Switches 36 and 43 are illustrated in FIG. 1 as being set in the pulse position modulation scheme of transmission.

Figure 2:
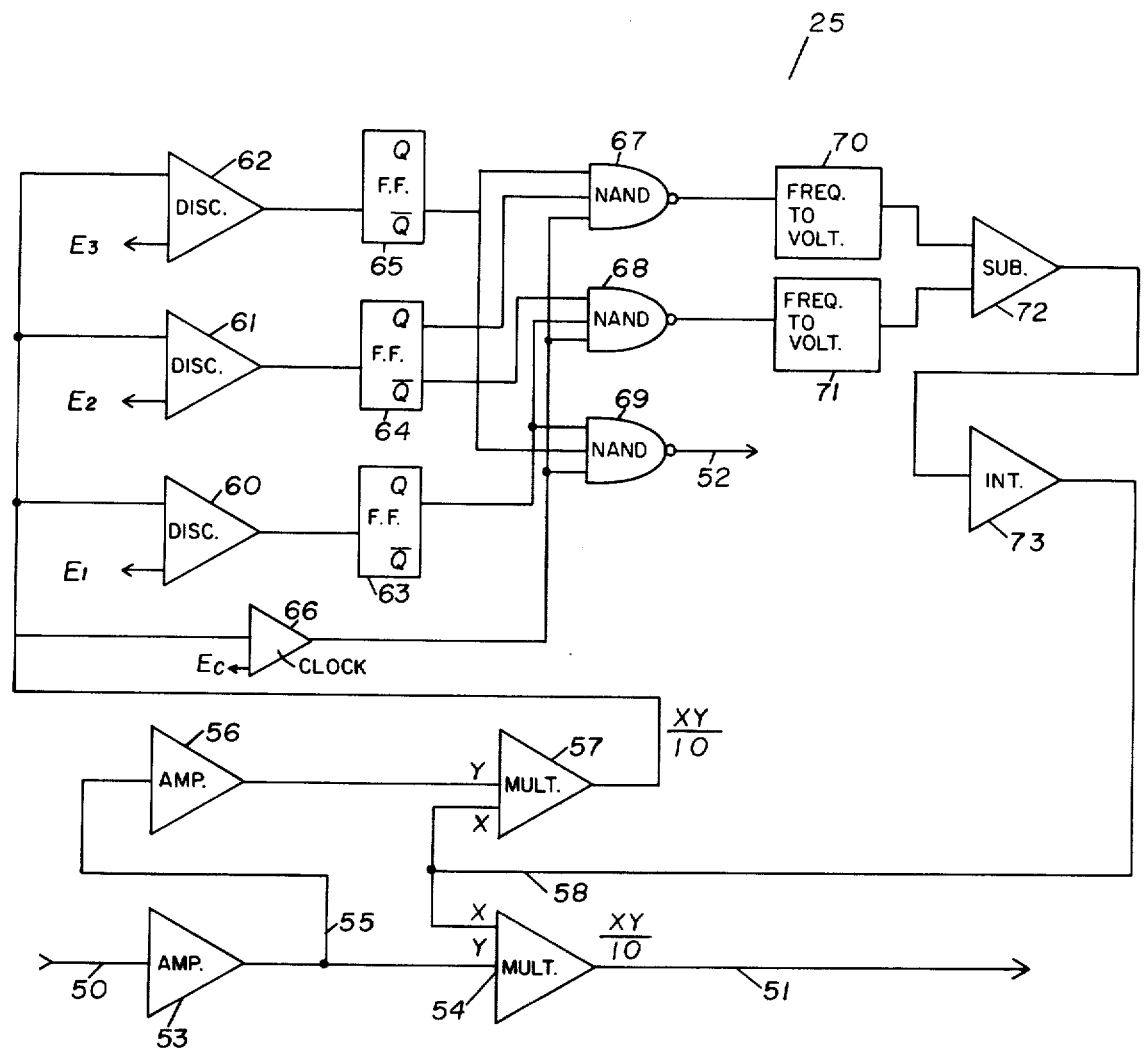
FIG. 2 is a block diagram of the spectrum stabilizer circuit.

The spectrum stabilizer circuit 25 is more fully illustrated in FIG. 2 and includes the input 50, the stabilized spectrum output 51, and the calibrate channel output 52 also shown in FIG. 1.

The input 50 is connected to a linear amplifier 53 whose output is supplied to the Y input of a correcting multiplier 54. A second X input of multiplier 54 is connected to correction factor input lead 58 which will be explained more fully later. The output of the amplifier 53 is also supplied to a take-off lead 55 which is in turn supplied to a second linear amplifier 56. The output of amplifier 56 is supplied to the Y input of a correcting multiplier reference 57 which has its second X input connected to lead 58. The output from the correcting reference multiplier 57 has a transfer function of (XY)/10 and is connected to: a discriminator 60 for the lower edge of the lower window to discriminate all pulses below the reference voltage $E_1$ corresponding to 40 Kev; a discriminator 61 for the middle of the calibrate channel separating the upper and lower window and discriminating all pulses below the reference voltage $E_2$ corresponding to 60 Kev; a discriminator 62 for the upper edge of the upper window discriminating all pulses below the reference voltage $E_3$ corresponding to 80 Kev; and a clock circuit 66 which includes a discriminator for sensing all pulses above the reference voltate $E_c$ which is below the reference voltage $E_1$ of the lower edge of the lower window.

As shown in FIG. 2, the inputs to NAND gate 67 is the $\overline{Q}$ output of flip flop 65, the Q output of flip flop 64 and the output of clock 66. The inputs to NAND gate 68 is the Q output of flip flop 64, the Q output of flip flop 63 and the output of clock 66. The inputs to NAND gate 69 is the $\overline{Q}$ output of flip flop 63, the $\overline{Q}$ output of flip flop 65 and the output of clock 66.

The output of NAND gate 67 provides a train of pulses corresponding to the input pulses in the upper window between reference voltages $E_2$ and $E_3$. The output of NAND gate 68 provides a train of pulses corresponding to the input pulses in the lower window between the reference voltages $E_1$ and $E_2$. A frequency-to-voltage converter 70 is connected to the output of NAND gate 67 to provide a DC voltage proportional to the frequency of the pulses in the upper window.

The frequency-to-voltage converter 71 is connected to the output of NAND gate 68 for providing a DC voltage proportional to the frequency of pulses in the lower window.

A DC subtractor 72 subtracts the voltage of lower window converter 71 from the voltage of upper window converter 70 and supplies its output to a DC integrator 73. The integrator 73 provides an initial correction factor via lead 58 to multipliers 57 and 54. The initial value is corrected by a ramp up with a negative input, a ramp down with a positive input, and stays the same with a zero input.

Figure 3:
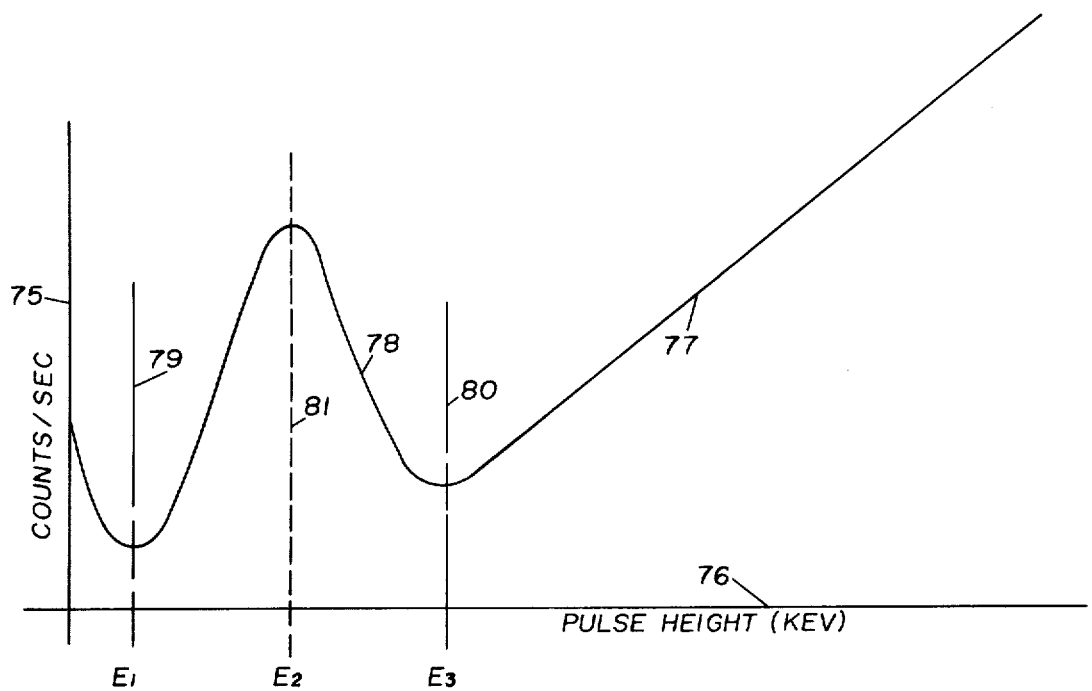
FIG. 3 is a graph of the pulse per second versus pulse height spectrum showing the peak of the reference source.

FIG. 3 is a graph of the counts per second versus pulse heights as registered by the detector for the calibration source 22. The ordinate of the curves 75 is the counts per second registered by the detector. The abscissa of the graph 76 is the pulse height of the pulses detected in Kev. Curve 77 is a typical curve of counts per second versus pulse height of the energy spectrum of the americium 241 reference source 22. The curve 77 exhibits a peak 78 at about 60 Kev. This peak is chosen such that it is removed from the energy window of interest so that the effects of the reference peak do not need to be compensated for in the data transmitted to the surface.

Vertical line 79 shows the lower edge of the peak 78 which is at about 40 Kev. The preamp 24 and the amplifiers 53 and 56 are designed such that a reference voltage $E_1$ is established at this lower edge 79. In the preferred embodiment this voltage is about 3.0 volts. Vertical line 80 represents the upper edge of peak 78 and is at about 80 Kev. The aforementioned amplifiers are designed such that the upper threshold voltage of $E_3$ is about 5.0 volts.

Vertical line 81 is set at the center of peak 78 at about 60 Kev. Its threshold voltage level $E_2$ is about 4.0 volts. The spectrum stabilizer circuit 25 is designed such that initially the counts between vertical lines 79 and 81 is equal to the counts between vertical lines 80 and 81.

Figure 4:
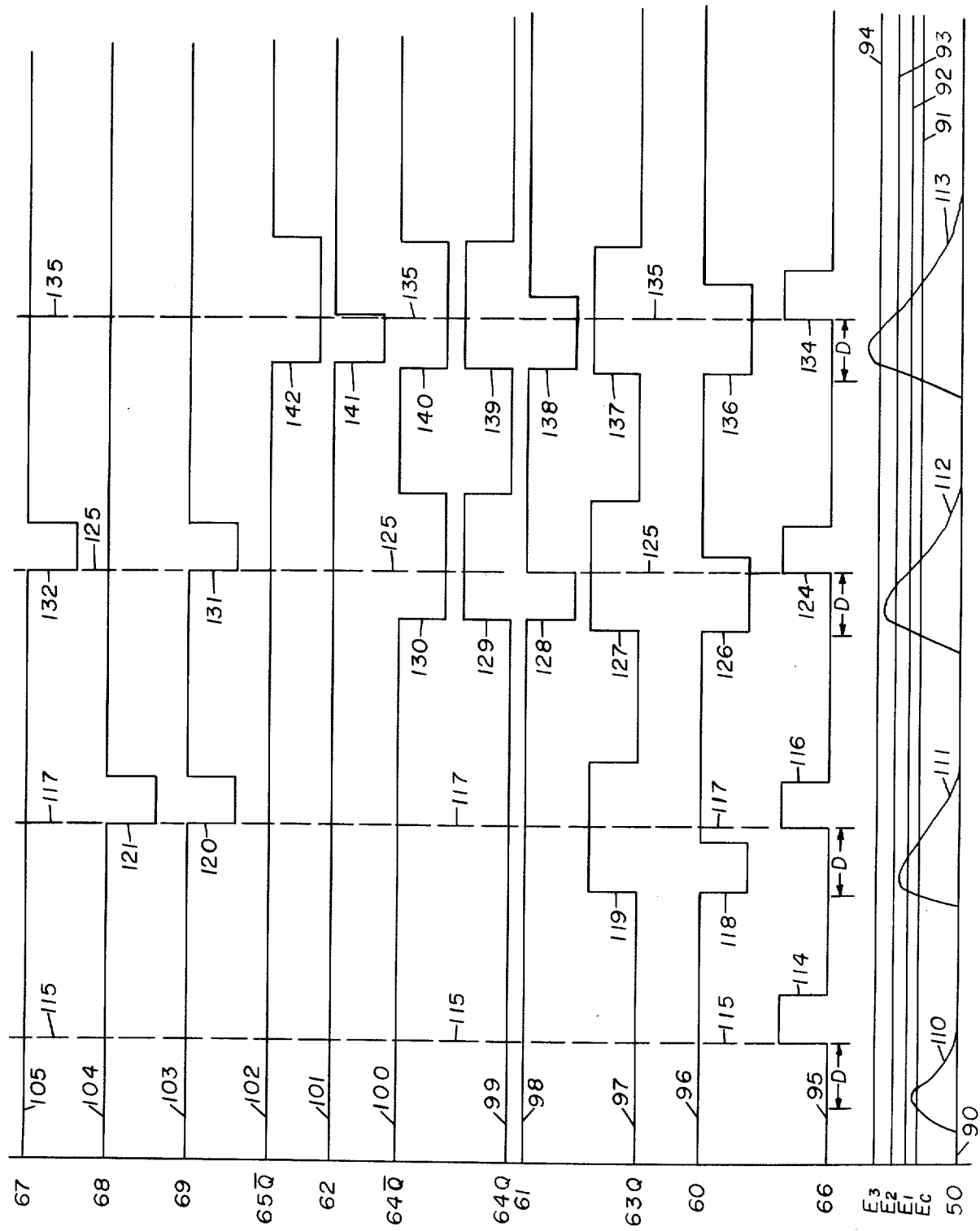
FIG. 4 is a timing diagram showing the timing of pulses generated by various elements of the spectrum stabilizer circuit.

FIG. 4 is a timing diagram for elements of the spectrum stabilizer circuit 25. Line 90 is a voltage versus time trace of the signal input 50 of the stabilizer circuit 25. Line 91 shows the thresholds level $E_c$ of the clock 66. Line 92 illustrates the threshold level $E_1$ of discriminator 60, line 93 illustrates the threshold level $E_2$ of discriminator 61, and line 94 illustrates the threshold level $E_3$ of discriminator 62.

Pulse 110 illustrates an incoming signal having a height over the threshold level $E_c$ for the clock 66 but below the threshold level $E_1$ of the discriminator 60. Pulse 111 is an input pulse in the lower window and having a height between threshold level $E_1$ of discriminator 60 and threshold level $E_2$ of discriminator 61. Input pulse 112 is a signal pulse in the upper window and having a height between the threshold level $E_2$ of discriminator 61 and the threshold level $E_3$ of discriminator 62. Input pulse 113 is a signal pulse having a height greater than the threshold level $E_3$ of discriminator 62.

Line 95 is a trace of the output of clock 66. The clock 66 contains a one shot device which generates positive going pulses 114, 116, 124 and 134, each a set time D after the threshold $E_c$ has been exceeded by signal pulses 110, 111, 112 and 113 respectively.

Line 96 is a trace of the output of discriminator 60 which produces a negative going pulse after the threshold level $E_1$ has been exceeded by an input pulse. For instance, the input pulses 111, 112 and 113 produce the negative going pulses 118, 126 and 136 respectively. Line 97 is a trace of the Q output of flip flop 63 and generates a positive going pulse having a set duration after receiving a negative going pulse from discriminator 60. As illustrated in FIG. 4, positive going pulses 119, 127 and 137 are generated at the Q output of flip flop 63 in response to negative going pulses 118, 126 and 136 respectively.

The clock circuit 66 includes an adjustable time delay means for delaying the pulse from the clock 66 a predetermined amount of time after the threshold voltage $E_c$ has been exceeded. When an incoming pulse such as pulse 111 exceeds both the threshold $E_c$ of clock 66 and the threshold $E_1$ of discriminator 60, the time D is adjusted such that the leading edge of positive going pulse 116 will be approximately centered in the positive going pulse 119 of trace 97. Likewise, the leading edge of positive going pulse 124 will be approximately centered in the positive going pulse 127 and the leading edge of positive going pulse 134 will be approximately centered in the positive going pulse 137.

Line 98 is a trace of the output of discriminator 61. The trace 98 shows negative going pulses 128 and 138 when the input pulses 112 and 113 exceed the threshold level $E_2$ of the discriminator 61. Line 99 of FIG. 4 shows a trace of the Q output of flip flop 64 and shows positive going pulses 129 and 139 generated in response to the negative going pulses 128 and 138 respectively.

Line 100 shows a trace of the $\overline{Q}$ output of flip flop 64 and shows negative going pulses 130 and 140 generated in response to negative going pulses 128 and 138 respectively.

Line 101 of FIG. 4 is a trace of the output of discriminator 62 and has a negative going pulse 141 which is generated when the input pulse 113 exceeds the threshold level $E_3$ of the discriminator 62. Line 102 of FIG. 4 shows the trace of the $\overline{Q}$ output of flip flop 65 and shows a negative going pulse 142 which is generated in response to the negative going pulse 141 of discriminator 62.

Line 103 of FIG. 4 is the output of NAND gate 69, line 104 is the output of NAND gate 68, and line 105 is the output of NAND gate 67. Vertical lines 115, 117, 125 and 135 show the state of each of the elements at the leading edge of clock pulses 114, 116, 124 and 134 respectively.

Looking at vertical line 115, during the clock pulse 114, the input and output of NAND gate 67 will be as follows:

| OUTPUT | REFERENCE NUMBER | STATE |
|---|---|---|
| 65 $\overline{Q}$ | 102 | High |
| 64 Q | 99 | Low |
| 66 | 114 | High |
| 67 | 105 | High |

At vertical line 115, the input and output of NAND gate 68 will be as follows:

| OUTPUT | REFERENCE NUMBER | STATE |
|---|---|---|
| 64 $\overline{Q}$ | 100 | High |
| 63 Q | 97 | Low |
| 66 | 114 | High |
| 68 | 104 | High |

At vertical line 115, the input and output of NAND gate 69 will be as follows:

| OUTPUT | REFERENCE NUMBER | STATE |
|---|---|---|
| 63 Q | 97 | Low |
| 65 $\overline{Q}$ | 102 | High |
| 66 | 114 | High |
| 69 | 103 | High |

Looking at vertical line 117, during the clock pulse 116, the input and output of NAND gate 67 will be as follows:

| OUTPUT | REFERENCE NUMBER | STATE |
|---|---|---|
| 65 $\overline{Q}$ | 102 | High |
| 64 Q | 99 | Low |
| 66 | 116 | High |
| 67 | 105 | High |

At vertical line 117, the input and output of NAND gate 68 will be as follows:

| OUTPUT | REFERENCE NUMBER | STATE |
|---|---|---|
| 64 $\overline{Q}$ | 100 | High |
| 63 Q | 119 | High |
| 66 | 116 | High |
| 68 | 121 | Low |

At vertical line 117, the input and output of NAND gate 69 will be as follows:

| OUTPUT | REFERENCE NUMBER | STATE |
|---|---|---|
| 63 Q | 119 | High |
| 65 $\overline{Q}$ | 102 | High |
| 66 | 116 | High |
| 69 | 120 | Low |

Looking at vertical line 125, during the clock pulse 124, the input and output of NAND gate 67 will be as follows:

| OUTPUT | REFERENCE NUMBER | STATE |
|---|---|---|
| 65 $\overline{Q}$ | 102 | High |
| 64 Q | 129 | High |
| 66 | 124 | High |
| 67 | 132 | Low |

At vertical line 125, the input and output of NAND gate 68 will be as follows:

| OUTPUT | REFERENCE NUMBER | STATE |
|---|---|---|
| 64 $\overline{Q}$ | 130 | Low |
| 63 Q | 127 | High |
| 66 | 124 | High |
| 68 | 104 | High |

At vertical line 125, the input and output of NAND gate 69 will be as follows:

| OUTPUT | REFERENCE NUMBER | STATE |
|---|---|---|
| 63 Q | 127 | High |
| 65 $\overline{Q}$ | 102 | High |
| 66 | 124 | High |
| 69 | 131 | Low |

Looking at vertical line 135, during the clock pulse 134, the input and output of NAND gate 67 will be as follows:

| OUTPUT | REFERENCE NUMBER | STATE |
|---|---|---|
| 65 $\overline{Q}$ | 142 | Low |
| 64 Q | 139 | High |
| 66 | 134 | High |
| 67 | 105 | High |

At vertical line 135, the input and output of NAND gate 68 will be as follows:

| OUTPUT | REFERENCE NUMBER | STATE |
|---|---|---|
| 64 $\overline{Q}$ | 140 | Low |
| 63 Q | 137 | High |
| 66 | 134 | High |

-continued

| OUTPUT | REFERENCE NUMBER | STATE |
|---|---|---|
| 68 | 104 | High |

At vertical line 135, the input and output of NAND gate 69 will be as follows:

| OUTPUT | REFERENCE NUMBER | STATE |
|---|---|---|
| 63 Q | 137 | High |
| 65 $\overline{Q}$ | 142 | Low |
| 66 | 134 | High |
| 69 | 103 | High |

It will thus be understood by those skilled in the art that the calibrate channel output of NAND gate 69 will provide negative going pulses 120 when the input pulse 111 is in the lower window between threshold voltages $E_1$ and $E_2$. The calibrate channel will also generate a negative going pulse 131 when an input pulse 112 is in the upper window between threshold voltages $E_2$ and $E_3$. The lower window output of NAND gate 68 will produce a negative going pulse 121 when an input pulse 111 is in the lower window between the threshold voltages $E_1$ and $E_2$. The upper window output 105 of NAND gate 67 will produce a negative going pulse 132 when an input pulse 112 is in the upper window between threshold voltages $E_2$ and $E_3$. There will be no output pulses from NAND gates 67, 68 or 69 if an input pulse 110 is below the threshold level $E_1$ of discriminator 60 or an input pulse 113 is above the threshold level $E_3$ of discriminator 62.

Referring back to FIG. 2, as long as the frequency of the pulses in the upper window from NAND gate 67 is equal to the frequency of pulses in the lower window from NAND gate 68, the output from subtractor 72 will not change, and the signal from integrator circuit 73 will remain the same. If the response of the scintillation detector, including the crystal 21, the photomultiplier tube 23, or the electronics in circuits 24 or 25, changes such that the frequency of pulses in the upper window increases and the frequency of pulses in the lower window decreases, the voltage from the subtractor circuit 72 will increase. This increase in voltage will be applied to integrator circuit 73 which will cause its output to ramp down to a new correction value.

This new correction value will be applied to the X input of amplifiers 54 and 57 by lead 58. The multiplier transfer function for amplifier 54 is (XY)/10. The initial correction factor for the X input is typically about 6 volts. If, for instance, the peak voltage for the americium source 22 is 6.67 volts, the resultant peak voltage out of multiplier 57 would be (6×6.67)/10=4.0 volts.

If the photomultiplier tube output dropped due to temperature, and the americium source peak voltage dropped to 4 volts, more pulse counts would appear in the lower window. The voltage from frequency-to-voltage converter 71 would increase, and the voltage from frequency-to-voltage converter 70 would decrease such that the output of subtractor 72 would be negative. This negative value would cause the output of integrator 73 to ramp up until the correction factor reached 10.0 volts. At this time the output of multiplier 57 would againt be (4×10.0)/10=4.0 volts and the counts in the lower window would equal the counts in the upper window.

In the same way, if the peak voltage of the americium source 22 drifted up, the output from the integrator 73 would ramp down subtracting from the original correction factor until the counts in the lower window again equaled the counts in the upper window.

Thus, the entire spectrum would be corrected, and the desired energy levels could be selected by discriminator circuit 26.

The foregoing embodiments are intended to be illustrative of the invention disclosed. The attached claims are intended to cover the illustrative embodiments and other equivalent embodiments which may occur to one skilled in the art.

What is claimed is:

1. In a radiation detector having a scintillation crystal, a photomultiplier tube for generating electrical pulses proportional to light flashes in the crystal, and an amplifier having an adjustable gain for amplifying the electrical pulses, a gain stabilizing means comprising:

a radiation source located in said crystal at an end thereof opposite from said photomultiplier, said source emitting monoenergetic radiation having an energy peak outside the range of energy levels being examined by said radiation detector and shielding means around said scintillation cyrstal for shielding said crystal from radiation having energy equal to the energy of said radiation source; and electrical means connected to the adjustable gain of said amplifier and responsive to the pulses from said photomultiplier tube for adjusting the gain of said amplifier until the pulses generated by said photomultiplier tube responsive to said monoenergetic radiation are of a predetermined height.

2. The apparatus of claim 1 wherein said radiation source emits gamma rays having a peak of about 60 Kev.

3. The apparatus of claim 1 wherein said shield is cadmium.

4. The apparatus of claim 1 further comprising samarium means around said crystal for compensating the output of said radiation detector for salinity effects.

5. The apparatus for claim 2 comprising window discriminator means electrically connected to said amplifier means for passing pulses generated by said photomultiplier tube responsive to radiation having energy from 500 Kev to 2.5 Mev.

6. In a radiation detector having a scintillation crystal, a photomultiplier tube for generating electrical pulses proportional to light flashes in the crystal, and an amplifier having an adjustable gain for amplifying the electrical pulses, a method stabilizing the detector comprising:

emitting into the end of said crystal opposite from said photomulitplier tube, monoenergetic radiation having an energy peak outside the range of energy levels being examined by said radiation detector by shielding said crystal from radiation having energy equal to the energy of said radiation source; and adjusting the gain of said amplifier responsive to the pulses from said photomultiplier tube until the pulses generated by said photomultiplier tube responsive to said monoenergetic radiation are of a predetermined height.

7. The method of claim 6 wherein said emitting step comprises emitting gamma rays having a peak of about 60 Kev.

8. The method of claim 6 wherein said shielding step comprises shielding said scintillation crystal with cadmium provided around said cyrstal.

9. The method of claim 6 further comprising passing the radiation being detected through samarium for compensating the output of said radiation detector for salinity effects.

10. The method of claim 7 comprising discriminating the radiation responsive pulses generated by said photomultiplier tube to those having energy from 500 Kev to 2.5 Mev.

11. An apparatus for use in well logging comprising:
a logging sonde operable for moving through a borehole;
a photomultiplier tube in said logging sonde;
a scintillation crystal having one end in contact with said photomultiplier tube for generating light flashes in said crystal responsive to radiation;
a radiation source in the end of said crystal removed from said photomultiplier tube for providing a predetermined spread of radiation intensity in said crystal for generating a predetermined spread of data pulse heights from said photomultiplier tube;
a shield around said crystal for shielding said crystal from radiation having an intensity equal to the intensity of said radiation source;
an electronic window means in said logging sonde for generating a first train of pulses responsive to the pulses in a first part of said predetermined spread of data pulse heights;
an electronic window means in said logging sonde for generating a second train of pulses responsive to the pulses in a second part of said predetermined spread of data pulse heights, the number of pulses in said first train of pulses being equal in an initial state to the number of pulses in said second train of pulses;
an integrator for generating a correction signal responsive to the difference in the number of pulses in one of said train of pulses from the number of pulses in the other of said train of pulses; and
pulse height varying means for varying the heights of all the pulses in said spectrum of pulses responsive to said correction signal.

12. The apparatus of claim 11 further comprising a window discriminator means for generating data pulses responsive to pulses in said spectrum which are at different energy levels than those in said predetermined spread of radiation source, and a recording means removed from said borehole for recording said data pulses.

13. The apparatus of claim 12 wherein said spread of predetermined pulse height energy levels is from 40 Kev to 80 Kev and the energy levels of said window discriminator means is from 500 Kev to 2.5 Mev.

14. The apparatus of claim 11 further comprising a sleeve inside the logging sonde surrounding the scintillation crystal and having a high neutron capture cross-section for reducing the effects upon the data pulses of chlorine in the borehole.

15. The apparatus of claim 14 wherein said sleeve includes samarium.

* * * * *